Patented Aug. 22, 1933

1,923,495

UNITED STATES PATENT OFFICE 1,923,495

PROCESS FOR OBTAINING LUSTERLESS ARTIFICIAL SILKS

Alexander Theodorovitch Maximoff, Milan, Italy, assignor to "Chatillon" Societa Anonima Italiana per la Seta Artificiale, Milan, Italy No Drawing. Application May 21, 1929, Serial No. 364,954, and in Italy January 8, 1929

1 Claim. (Cl. 106—40)

Many researches have been made and a number of processes have been proposed for obtaining artificial silks having a less lustrous appearance than normal artificial silks, and the solution of this problem has been attempted by either giving a special treatment to the finished article or by modifications and additions during the spinning operation.

For practical results most of all viscose silks are to be considered, and to the latter my present invention refers.

Nearly all of the patents dealing with this question propose to obtain dim or lusterless fibres by occlusion of solid, liquid or gaseous particles therein which by producing a discontinuity in the material and thereby depriving same of its transparency obtain the desired delustrating action.

Thus f. i. in Brit. Pat. 294,623 in the fibre at the moment of spinning a deposit of lead or barium sulfate, and in Brit. Patent 290,263 a precipitate of an insoluble titanium compound is effected.

Others use a viscose containing sulfides, sulfites, thiosulfates and other substances capable of separating the sulphur at the moment of coagulation, whilst others spin directly solutions of cellulose or its derivatives, such as viscose, containing liquid or gaseous emulsion which during the coagulation of the filament remain in the fibre in form of microscopically small gutlets or bubbles.

French Pat. 637,309 proposes addition to colloidal spinning solutions, i. e. either acetate, cuproammoniacal or viscose silks, of mineral or vegetal oils, greases, wax, fatty acids, aniline, tetrahydronaphtaline, nitrobenzol, suspensions of thorium oxide, magnesium soap, and the like.

According to Brit. Pat. 273,386 a process is used in which small quantities of petroleum or vaseline are added, this process being furthermore improved by the addition of small quantities of cyclohexanol according to Brit. Pat. 294,805.

Also addition of mono- or di-chlorobenzene or xylene to viscose have been proposed for delustration of artificial silks.

In Brit. Pat. 273,647 the use of olive oil, soaps and hydrogenated hydrocarbons is proposed, whilst in Brit. Pat. 292,627 organic nitrogen compounds such as caseine, albumin, etc., are added.

Applicant has found that by a simple addition to the solutions ready for spinning, and particularly viscose, in certain natural emulsions, of animal or vegetal nature f. i. of milk of mammals, such as cow milk, or different latexes the desired purpose of producing a lusterless silk of an appearance similar to that of natural silks, and of very good characteristics, will be obtained.

Furthermore in my said improved process no preliminary preparation of the additional substance nor any special apparatus or arrangement will be needed, but the milk may be added at any moment and in any ordinary vessel provided with a stirrer, whilst special plants are necessary in other systems, such as described in British Pat. 285,958.

It will be obvious that my present invention cannot be used with solutions of cellulose or its derivatives producing a coagulating effect on, or otherwise altering, the milk.

The quantity of milk to be added will vary according to the degree of delustration desired, and generally will not exceed 10% of the spinning solution.

*Example I.*—To 100 parts of ordinarily prepared viscose from 2 to 10 parts of cow milk are added; the viscose accurately mixed is submitted to the usual de-aeration and ripening and then spun in the usual way. Afterwards it is well washed so as to eliminate the coagulation bath, the albuminoid and sugary substances, then dried and worked further as usual.

*Example II.*—To 100 parts of ordinarily prepared spinning cellulose solution from 2 to 8% of cocoa-nut palm latex is added. The mixture is energetically stirred, after which the operation continues as stated in Example 1.

Having now particularly described and ascertained the nature of my said invention and in what way the same is to be performed, I declare that what I claim is:

Process for manufacturing artificial silks with reduced luster, characterized in that to the spinning solutions milk is added in variable quantities ranging between 2 and 10% according to the degree of delustration desired, and this mixture is then spun by one of the usual methods.

ALEXANDER THEODOROVITCH MAXIMOFF.